Dec. 12, 1961     D. C. BROWN     3,012,336
FURNITURE SELECTING AND POSITIONING MEANS AND METHOD
Filed Jan. 19, 1959     3 Sheets-Sheet 1

INVENTOR
DANIEL C. BROWN
BY
Curtis, Morris & Safford
ATTORNEYS

Dec. 12, 1961  D. C. BROWN  3,012,336
FURNITURE SELECTING AND POSITIONING MEANS AND METHOD
Filed Jan. 19, 1959  3 Sheets-Sheet 2
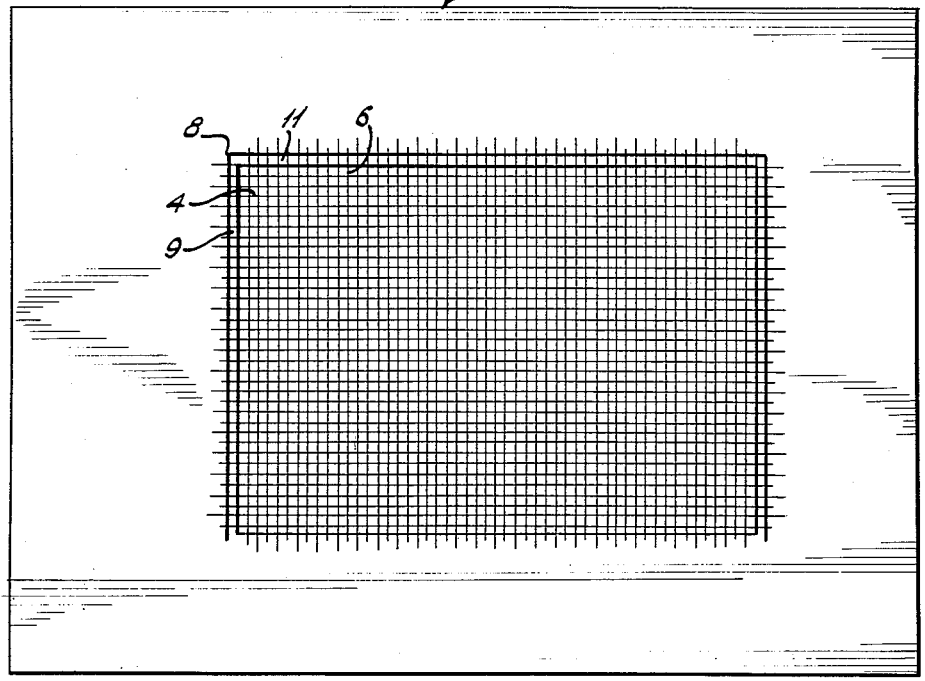
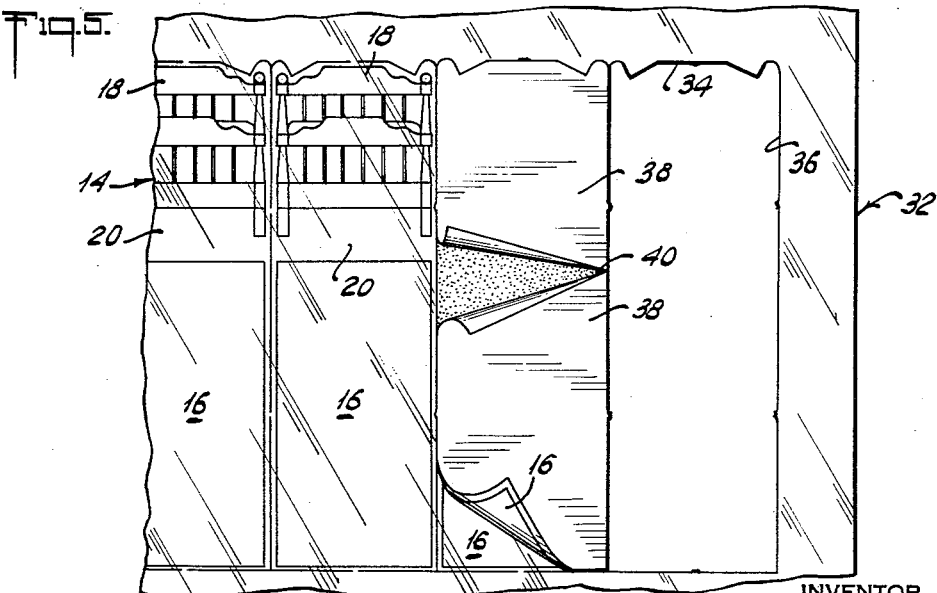
INVENTOR
DANIEL C. BROWN
BY
Curtis, Morris & Safford
ATTORNEYS Dec. 12, 1961 D. C. BROWN 3,012,336
FURNITURE SELECTING AND POSITIONING MEANS AND METHOD
Filed Jan. 19, 1959 3 Sheets-Sheet 3
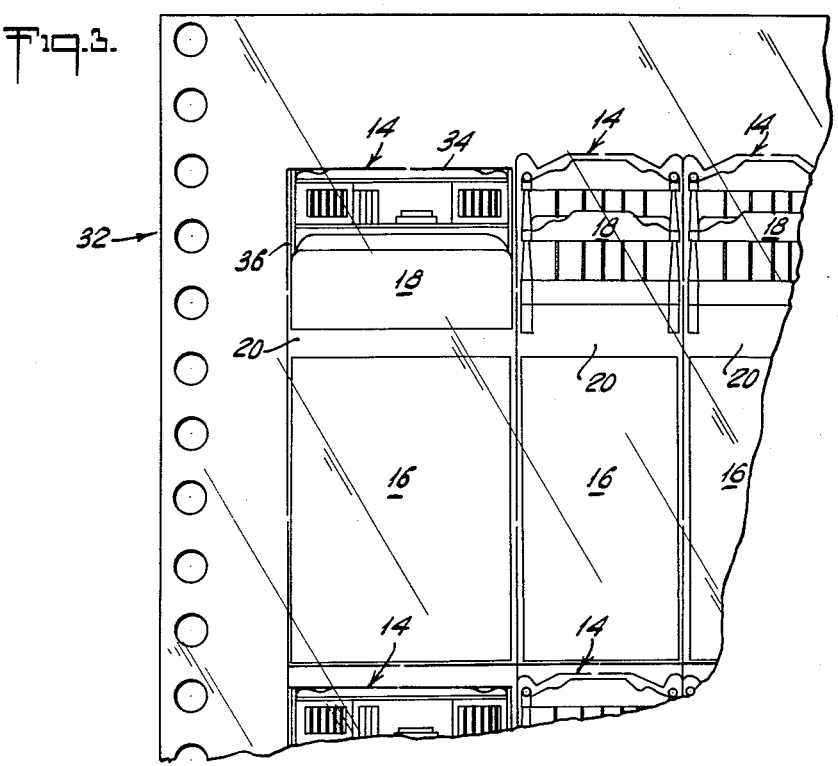
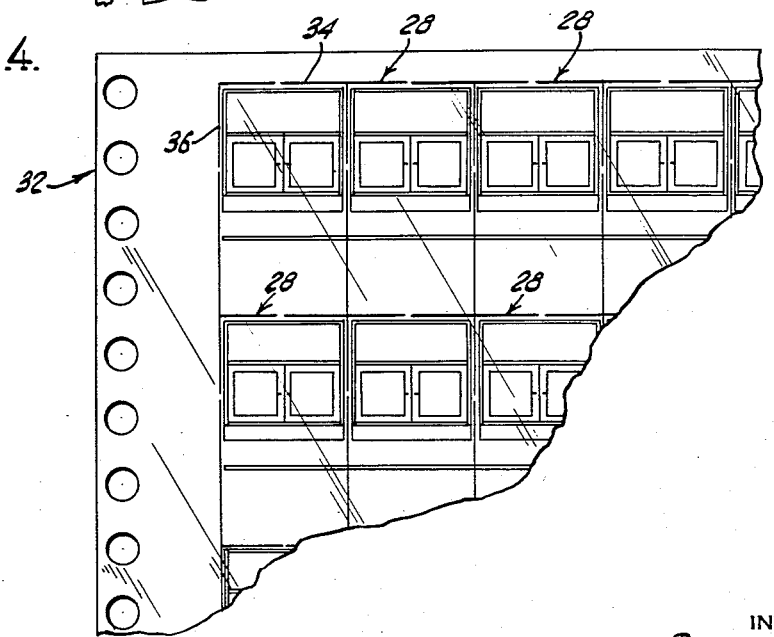
INVENTOR
DANIEL C. BROWN
BY
Curtis, Morris & Safford
ATTORNEYS

United States Patent Office 3,012,336
Patented Dec. 12, 1961

3,012,336
FURNITURE SELECTING AND POSITIONING MEANS AND METHOD
Daniel C. Brown, New Rochelle, N.Y., assignor to Baumritter Corporation, New York, N.Y., a corporation of New York
Filed Jan. 19, 1959, Ser. No. 787,719
1 Claim. (Cl. 35—7)

This invention relates to methods and means for selecting specific pieces of furniture for rooms and for representing the general appearance of furniture groupings in rooms.

In the past, various schemes have been used for selecting pieces of furniture to be used in a room, and also for determining the possible arrangement of furniture groups without the physical exertion of assemblying and moving the furniture itself. These prior schemes have been somewhat satisfactory for people having a vivid imagination and the ability to visualize the proposed arrangements. However, for many people, the prior schemes are of little or no value.

It is an object of the present invention to provide improved methods and means for accomplishing the intended purposes of the prior schemes. It is a further object to provide new and improved methods and means for aiding persons in visualizing a proposed furniture selection and arrangement. It is a further object to provide for the physical arrangement of parts representing furniture and to give a visual aid in understanding how the actual furniture will look in the room. It is a further object to provide for the above with means which is easy to use, adaptable to various conditions of use, and which gives a permanent record of the results of the work done. These and other objects will be in part obvious and in part pointed out above.

In the drawings which illustrate one embodiment of the invention:

FIGURE 2 is a sheet or chart which constitutes one element of the assembly of FIGURE 1;

FIGURES 3 and 4 are fragmentary views of other components which are utilized in producing the assembly of FIGURE 1; and FIGURE 5 is a perspective view illustrating the manner of utilizing components, such as shown in FIGURES 3 and 4.

Figure 1:
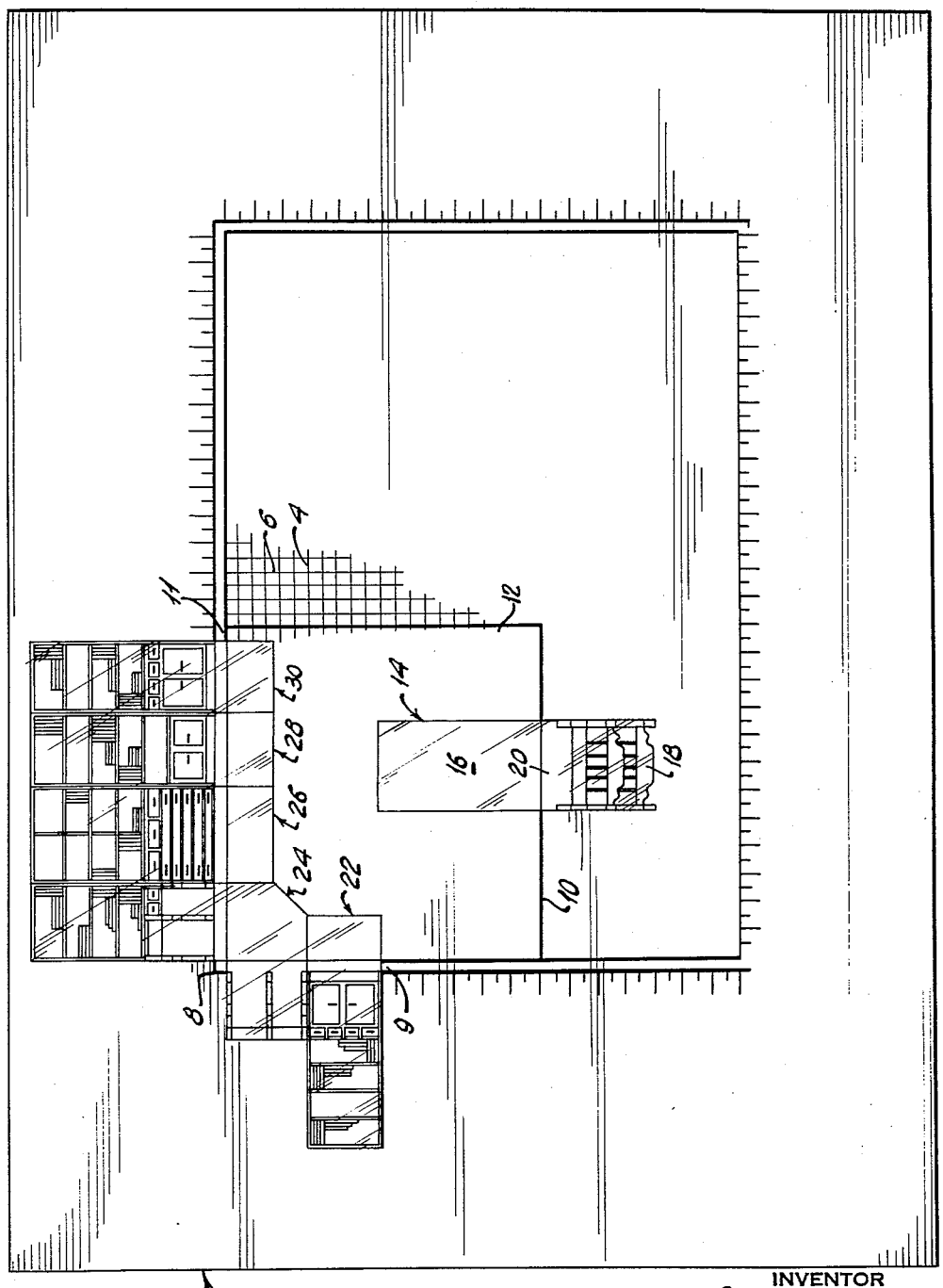
FIGURE 1 is a plan view of an assembly of parts representing a proposed furniture arrangement for a specific room.

Referring to FIGURE 1 of the drawings, a chart or sheet 2 has horizontal and vertical lines, respectively indicated at 4 and 6, each of which is numbered to indicate a scale representation of the number of feet from the corner 8 of a room. At the time of use, a specific room is outlined on chart 2, starting with walls 9 and 11 forming a square corner of the room at the corner 8, and drawing lines 10 and 12 to indicate the exact size and shape of the room according to the scale measurements and the cross lines 4 and 6. All doors, windows and other obstructions or features requiring special consideration are also placed on the chart in their proper positions and sizes.

Each available piece of furniture in the line being considered is represented by a component such as the bed component 14, which is shown separately in FIGURE 5 and is shown positioned on the chart in FIGURE 1. Bed component 14 is formed by a floor plan area portion 16, an elevation view portion 18 and a connecting portion 20. The person making the selection of furniture and its arrangement selects components representing particular pieces of furniture, and he places them as illustrated in FIGURE 1 with the floor plan area portion of each component positioned to scale in the exact position on chart 2 represented by its proposed position in the actual room. For example, the bed component 14 is shown three and one-half feet from wall 12 and with the head of the bed along wall 10. The appearance of the bed when facing wall 10 and from beyond the foot of the bed is as shown by the elevation view portion 18. Similarly, components 22, 24, 16, 28 and 30 have been selected as illustrative, and placed in position along the walls 9 and 11, as shown.

The floor plan is readily visualized because each of the components has its floor plan area positioned as its piece of furniture would be positioned, and each component is to scale. The appearance of wall 11 has been reproduced by the assemblying of the elevation view portions of the components 24, 26, 28 and 30. The elevation view of wall 9 is similarly represented by the elevation view portions of components 22 and 24.

Each of the components is held in place when once applied by a pressure sensitive coating on its under side. FIGURES 3 and 4 are illustrative of sheets 32 of components, and each component is die cut at 34 and 36, except at a narrow zone along each edge intermediate its corners, so that it may be removed from the sheet for use. As shown in FIGURE 5, the pressure sensitive coating on the rear side is masked by a sheet 38 which is slit at 40 transversely of the component. At the time of use, the component is bent so that its bottom side is convex and the two portions of the masking sheet are grasped at the slit 40 and peeled from the component, thus exposing the coating. A very important phase of this invention is the combination of the floor-plan area portion of each component with the pictorial representation or elevation view portion. In selecting individual pieces and deciding on groupings of the pieces in a room, a large number of the components may be removed from their sheets, and they may be arranged experimentally in many different arrangements prior to the removal of the masking sheets. When an acceptable group is found and the grouping has been determined, the masking sheets are removed and each component is permanently positioned in its selected place.

As various embodiments may be made of the above invention and as changes might be made in the embodiment above set forth, it is to be understood that the matter hereinbefore set forth or shown in the accompanying drawings is to be interpreted illustratively and not in a limiting sense.

I claim:

Means for selecting furniture to be used in a specific room and for determining the arrangement of the furniture in the room and for illustrating the side-wall appearance in two dimensions in the same plane as the representation of the floor plan of the room comprising, a base sheet comprising a central chart and a border surrounding the chart with the chart being marked with lines whereby the floor plan of a room can be outlined to scale and each side wall can be outlined adjacent its respective edge of the floor plan with said border portion providing sufficient area for the representation of each wall in its respective position and to the proper scale, and a plurality of components each of which is a flat sheet and represents a particular piece of furniture which may be selected and each of which represents a scale-floor plan area portion and an adjacent elevation view portion attached thereto along the edge of the piece of furniture, said elevation view portion of the piece of furniture representing to scale the appearance of the piece of furniture when positioned along the wall of the room with the elevaton view portion showing the relationship of that piece of furniture to the side wall of the room, each of said components having an adhesive coating on its under side by which it is affixed to said chart at the time of use with its scale-floor plan area portion positioned on the chart in the respective position of the furniture in the room, whereby the assembly of the scale-floor plan area portions of the selected pieces of furniture produce an illustration of the prospective floor plan arrangement in the specific room to be formed by the selected group of pieces of furniture, the attached elevation view portion of each of the components which is to be positioned along a particular wall being positioned on said sheet within the area representing that wall and in the same plane as the representation of the floor plan of the room thereby to form an illustration in a single plane and in two dimensions of the appearance of the side wall with the pieces of furniture positioned in the room, whereby the entire assembly of the sheet and the selected components is in two dimensions.

References Cited in the file of this patent

UNITED STATES PATENTS

| | | |
|---|---|---|
| 1,845,240 | Cook | Feb. 6, 1932 |
| 2,213,666 | Burke | Sept. 3, 1940 |
| 2,293,441 | Meyer | Aug. 18, 1942 |
| 2,878,586 | Ohlsson | Mar. 24, 1959 |